United States Patent
Taufenbach

(10) Patent No.: US 7,885,310 B2
(45) Date of Patent: Feb. 8, 2011

(54) GAS SLAB LASER

(75) Inventor: Norbert Taufenbach, Eckernförde (DE)

(73) Assignee: Taufenbach GmbH, Kiel (DE)

( * ) Notice: Subject to any disclaimer, the term of this patent is extended or adjusted under 35 U.S.C. 154(b) by 54 days.

(21) Appl. No.: 10/593,044

(22) PCT Filed: Mar. 18, 2005

(86) PCT No.: PCT/DE2005/000510

§ 371 (c)(1),
(2), (4) Date: May 7, 2007

(87) PCT Pub. No.: WO2005/096461

PCT Pub. Date: Oct. 13, 2005

(65) Prior Publication Data

US 2007/0263692 A1 Nov. 15, 2007

(30) Foreign Application Priority Data

Mar. 24, 2004 (DE) .................. 10 2004 014 815

(51) Int. Cl.
*H01S 3/22* (2006.01)
(52) U.S. Cl. .......................... 372/61; 372/55
(58) Field of Classification Search .............. 372/55, 372/57, 61–63
See application file for complete search history.

(56) References Cited

U.S. PATENT DOCUMENTS

| 3,537,030 | A | | 10/1970 | Dorbec et al. |
| 3,826,998 | A | * | 7/1974 | Kindl et al. ............ 372/107 |
| 4,217,559 | A | | 8/1980 | Van Den Brink et al. |
| 4,238,743 | A | * | 12/1980 | Golser et al. ............. 372/61 |
| 4,277,761 | A | * | 7/1981 | Silva et al. .............. 427/539 |
| 4,351,053 | A | * | 9/1982 | van den Brink ............ 372/61 |
| 4,638,486 | A | * | 1/1987 | Dost et al. ............... 372/107 |
| 4,856,020 | A | | 8/1989 | Ortiz |
| 4,893,314 | A | | 1/1990 | Shull et al. |
| 5,054,032 | A | * | 10/1991 | Krueger et al. ........... 372/107 |
| 5,661,746 | A | * | 8/1997 | Sukhman et al. ........... 372/83 |
| 2002/0071466 | A1 | * | 6/2002 | Zeller .................... 372/55 |

FOREIGN PATENT DOCUMENTS

| DE | 2 103 006 | 8/1972 |
| DE | 30 43 016 | 12/1981 |
| DE | 41 19 025 | 12/1992 |
| DE | 198 52 284 | 5/2000 |
| EP | 0 531 781 | 3/1993 |
| WO | 80/01123 | 5/1980 |

* cited by examiner

*Primary Examiner*—Minsun Harvey
*Assistant Examiner*—Phillip Nguyen
(74) *Attorney, Agent, or Firm*—Lucas & Mercanti, LLP; Klaus P. Stoffel

(57) ABSTRACT

The invention relates to a gas slab laser comprising a gas-filled chamber limited by a housing (1, 2, 3). The laser is provided with at least two high-frequency excited electrodes (5, 6) that extend into the housing and overlap. The electrodes define a discharge chamber (14). The laser is additionally provided with resonator mirrors (12, 13). In order to adjust the laser, the spatial arrangement of the electrodes and the resonator mirrors is optimized. Adjustment is carried out by applying a force (F) in the housing so that the spatial arrangement of the resonator mirrors is optimized as a result of the bending of the housing caused by the application of force. Deformation of the housing can occur plastically or elastically by maintaining the deforming forces.

13 Claims, 3 Drawing Sheets

GAS SLAB LASER

The invention concerns a gas slab laser in accordance with the introductory clause of the independent claim.

Gas slab lasers are described, for example, in DE 198 52 284. Their geometry is characterized by the fact that two plate-shaped electrodes arranged essentially parallel to each other form a narrow discharge chamber for a laser gas, which is excited by a high-frequency voltage applied to the electrodes. To produce laser action, resonator mirrors are arranged at the opposite end faces of the narrow discharge chamber formed by the electrodes.

In addition, the design according to the prior art cited above is structurally simplified in such a way that at least two electrodes extend into the tubular housing, overlap each other, and form a discharge chamber. The electrodes are supported at opposite ends of the tubular housing, the mirrors are arranged in fixed positions relative to the electrodes, and the electrodes, together with the mirrors, can be adjusted relative to each other.

The mirrors are adjusted by adjusting elements, which are mounted outside the hermetically sealed laser gas chamber. This is possible, because the ends of the housing are joined with each other by a spring bearing or a bellows.

The objective of the invention is further simplification of the above design by elimination of the adjusting elements and/or the spring bearing.

The resonator mirrors can then by adjusted by at least one of the following measures:

A. The resonator is adjusted by plastic deformation of the tubular housing and/or the structure supporting the end flanges and/or the mirrors, thereby producing the required spatial alignment of the resonator mirrors relative to each other. This can be carried out, for example, when the laser is turned on for a trial run, and the optimum adjustment is found by laser power measurement. It is also possible to find the proper adjustment via a pilot laser or a position measurement of the resonator mirrors. The laser structure can be plastically deformed, for example, by the following measures:

(a) Clamping the laser in a deformation device that can apply large, highly precise forces and thus plastically deforms the tubular housing and/or the end flanges of the laser beyond the elastic range.

(b) Adjustment of the laser by shot peen forming. Shot peen forming is used, for example, in rocket engineering for forming the Ariane tanks.

(c) Targeted heating of certain areas of the laser structure to bring about plastic deformation.

B. In one variant, the resonator is adjusted by elastically deforming the tubular housing and/or a structure supporting the end flanges and/or the mirrors by application of a constant force, thereby producing the required spatial alignment of the resonator mirrors relative to each other. In addition, this has the advantage that the adjustment of the resonator can be adapted by variation of the forces in the operation of the laser and thus controlled. The laser structure can be elastically deformed, for example, by the following measures:

(a) Application of a force by a constant elastic force according to FIG. 2 with the force F and the supports A and B.

(b) Application of a force by electrical elements, for example, piezoelectric devices or electromagnets.

(c) Application of a force by a medium, for example, compressed air or hydraulic medium.

(d) Application of a force by heating elements which heat the laser housing on one side and thus introduce forces.

(e) Application of a force by permanent magnets.

(f) Application of a mechanical force, for example, by a clamping screw.

C. In another variant, exact alignment of the resonator is accomplished by fixing at least one end flange or one mirror in place only after the adjustment. This can be carried out, for example, when the laser is turned on for a trial run, and the optimum adjustment is found by laser power measurement. It is also possible to find the proper adjustment via a pilot laser or a position measurement of the resonator mirrors. For this purpose, an adjusting device can be used, which is removed after the resonator has been adjusted and the structures supporting the mirrors have been fixed in place. The mirror-supporting parts, such as the end pieces 2 and 3, can be fixed in place, for example, by clamping, adhesive bonding, soldering, or welding. Automatic adjustment is also possible, for example, with the use of an adjusting device under computer control. The geometry of the resonator is varied by suitable servo drives.

Additional features and advantages of the invention are specified in the following description of a preferred embodiment of the invention.

FIG. 1 shows a laser of the invention for an external coolant circulation in a partially cutaway view, showing the two electrodes with the coolant channels and the structure of the end pieces and the HF lead-through.

Figure 1:
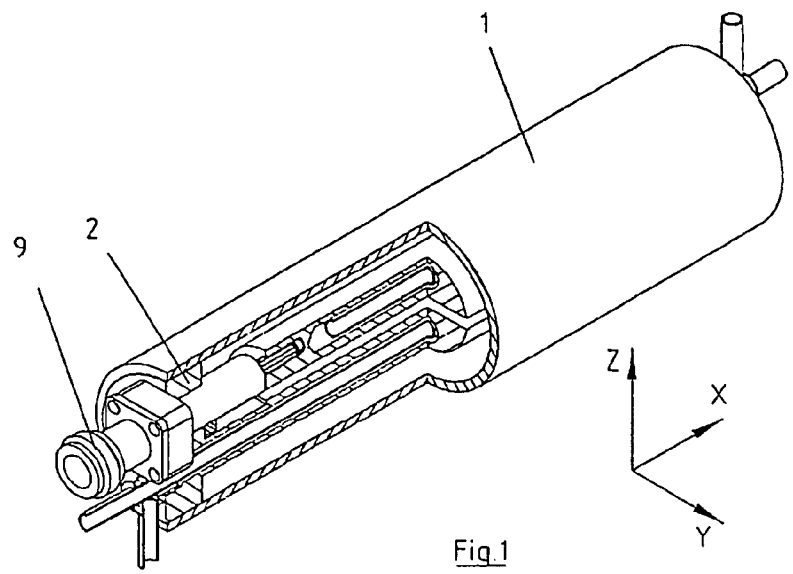
Figure 2:
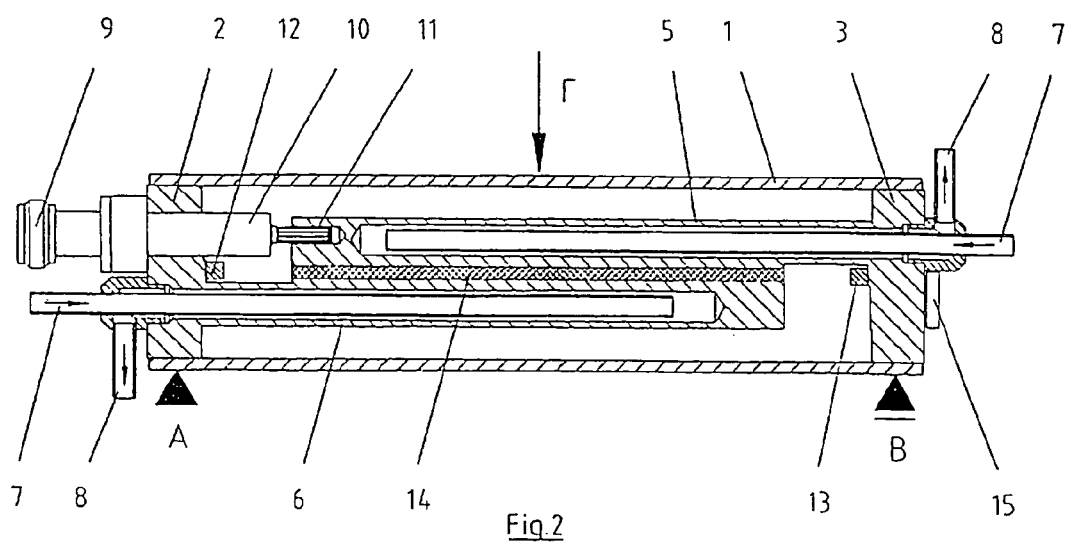
FIG. 2 shows the laser structure according to FIG. 1 in longitudinal section, also showing how a force F can be used with the supports A and B to deform the housing.

FIGS. 1 and 2 show the laser of the invention with the end pieces 2 and 3, which seal the tubular housing 1 at its ends. The tubular housing 1 can have any desired shape and can also be realized as a single part with the sealing end pieces 2 and 3. In this embodiment, the internally cooled electrodes 5 and 6 and the resonator mirrors 12 and 13 are held by the respective end pieces 2 and 3.

It is also possible for the electrodes 5 and 6 to be partially or exclusively mounted on the tubular housing. For example, the electrodes 5 and 6 can be electrically conductively connected at one end with the tubular housing 1 in such a way that the ground electrode/electrodes 6 are connected by their end facing the HF lead-through 10 with the electrically conductive or partially electrically conductive tubular housing 1, and the counterelectrode/electrodes 5 are connected by their end facing away from the HF lead-through 10 with the electrically conductive or partially electrically conductive tubular housing 1. In this regard, the respective end of each electrode can also be electrically conductively connected at one end by elastic means with the end pieces 2 and 3. The ground electrode is preferably grounded next to the HF power supply.

As a result of the electrically conductive connection of the electrodes at one end with the housing wall, which is at approximately ground potential, when a high-frequency alternating current is supplied, an electric voltage can develop between the electrodes 5 and 6 which is relatively uniformly distributed over the discharge gap 14. The voltage is sufficient to ignite a gas discharge, which in turn is relatively homogeneous. On the other hand, an electrically nonconductive mount or mounts that connect the electrodes with the tubular housing are possible at each position. If the above-described electrically conductive connection of the electrodes to the tubular housing at one end is selected, it can be additionally supplemented by individual or several electrically nonconductive mounts or by an electrically nonconductive mount that extends over the entire length of the electrode/electrodes.

To make it easier to understand the structural design, a system of coordinates with x, y, and z axes is included in FIG. 1. The x-axis corresponds to the connecting line between the resonator mirrors 12, 13 and thus extends in the longitudinal direction of the electrodes 5, 6. The y-axis extends perpendicularly to the longitudinal direction and lies in a center plane between the two electrodes 5, 6. The z-axis likewise extends perpendicularly to the longitudinal direction and passes through the two electrodes 5, 6. In a typical embodiment, an unstable resonator is provided in the y-direction, and a stable resonator is present in the z-direction.

FIG. 2 also shows the resonator mirrors 12 and 13. Mirror 12 is the return mirror, and mirror 13 is the output mirror of the laser. The laser beam exits the laser though the window 15. The high frequency is conducted to the electrode/electrodes 5 through the plug connector 9, the HF lead-through 10, which can contain an electric matching network, and the plug connector 11. The electrodes and the resonator mirrors are mechanically decoupled. The positions of the return mirror and the output mirror can be interchanged.

It is also apparent that the electrodes are internally cooled by a fluid medium. This was realized by a single blind hole drilled into the electrodes. A small tube 7 is then inserted in the drilled blind hole. The tube has a significantly smaller outside diameter than the inside diameter of the blind hole. The fluid medium can then be connected with a coolant circulation by the tubes 7 and 8 to provide optimum cooling of the electrodes over their entire length.

When a heat pipe is used, the internal tube can be dispensed with. The heat pipe can be provided with capillary materials or with sintered material. Most of the required heat dissipation occurs through the electrodes. Cooling with a fluid medium is unnecessary for low-power lasers, since heat transport by heat conduction through the electrodes is sufficient in this case.

Alternatively to the aforementioned plug connector 9, it is possible to use other electrically conductive connections. For example, it is possible to use wires or metallic or metallized plates.

To improve the electrical characteristics, a decoupling network is arranged in the area of the HF lead-through 10. A choke and capacitor connected in series are typically located between the plug connector 9 and the plug connector 11, with the capacitor being arranged directly adjacent to the plug connector 11. In the vicinity of a connection of the choke to the plug connector 9, this connecting lead is connected with the housing of the HF lead-through 10 by another capacitor. The housing is typically at ground potential. This second capacitor is positioned as closely as possible to the plug connector 9.

To increase the mechanical stability of the system shown in FIG. 2, it is possible to provide additional support of at least one of the electrodes (5, 6) relative to the tubular housing 1 by means of electrically nonconductive spacers. The spacer elements are preferably arranged in the vicinity of the end of the electrodes 5, 6 that is positioned facing away from the respective associated end piece 2, 3. FIG. 2 illustrates that the electrodes 5, 6 are dc short-circuited via the electrically conductive end pieces 2, 3 and the electrically conductive tubular housing. However, with respect to the applied high frequency, due to the inductance of the tubular housing (1), substantial electrical decoupling occurs with respect to the high frequencies despite the presence of the dc short circuit.

FIG. 2 also illustrates that the resonator mirrors 12, 13 are not mounted on or rigidly connected with the electrodes 5, 6. The connection is established only by the respective associated end piece 2, 3 of the tubular housing 1. It is thus basically possible to adjust the resonator mirrors 12, 13 independently of the electrodes 5, 6. Thermal stresses or deformations of the electrodes 5, 6 also do not lead to position changes of the resonator mirrors 12, 13.

Alternatively to the mounting of the electrodes 5, 6 by the end pieces 2, 3, as illustrated in FIG. 2, it is also possible to connect the electrodes 5, 6 laterally with the tubular housing 1 by mounting elements. This is accomplished in a manner similar to the aforementioned spacers. However, the mounting elements are designed to be electrically conductive, and the required cooling medium must then also be supplied at an angle via these mounting segments.

With respect to supplying the laser with high frequency through the high-frequency lead-through 10, the high-frequency lead-through 10 is typically preceded by a high-frequency amplifier to supply the necessary voltages. These high-frequency amplifiers can be operated in class A, B, AB, C, D, or E operating modes, depending on the given application requirements.

The laser can be operated in continuous-wave operation or in pulsed operation. A problem associated with the operation of pulsed lasers is that appreciable laser energy output occurs only after a turn-on delay. The turn-on delay for each pulse can typically be up to 100 microseconds. These turn-on delays are felt as extremely disturbing in many applications and reduce the quality of the work results achieved by the lasers. Regardless of the particular structural design of the laser and the precise adjustment of the parts that are used, a solution to this problem of turn-on delay is to provide a mode of operation for the laser and a geometry of the electrodes 5, 6 that significantly reduce the turn-on delay.

In accordance with the state of the art, the resonator mirrors 12, 13 consist of curved mirror surfaces with a constant radius of curvature. After the high-frequency signal has been supplied through the high-frequency lead-through 10, a series of reflection cycles between the resonator mirrors 12, 13 is first necessary to absorb sufficiently large numbers of photons from the electrode emission for a sufficient signal intensity to be present to allow laser operation.

The present invention proposes that the electrodes 5, 6 be arranged or designed in such a way that a locally bounded plasma, preferably of low intensity, permanently burns, so that immediately after the high-frequency signal has been switched on with the amplitude necessary for operation of the laser, the plasma can expand in the entire space separating the electrodes 5, 6 with an extremely small time delay. This results in extreme minimization of the turn-on delay of the laser.

To supply a suitable ground plasma of preferably low intensity, it is possible, for example, to provide at least one of the electrodes 5, 6 with a profile in such a way that a smaller distance between the electrodes 5, 6 is present in a locally limited region than in the remaining expansion region and that locally limited burning of the ground plasma occurs in this region with a small distance between the electrodes. The profile can be designed, for example, as a thickening of one of the electrodes 5, 6 and can be positioned either in a marginal region or in a central region of the electrodes 5, 6. The ground plasma preferably burns along a narrow sector between the resonator mirrors in the x-direction. The narrow side of the sector extends in the y-direction.

In accordance with another embodiment, it is also possible to use an additional electrode of small spatial extent. The ground plasma of preferably low intensity and small spatial extent burns between this additional electrode and one of the electrodes 5, 6. In accordance with another embodiment, the electrodes 5, 6 are not parallel but rather are slightly inclined and thus arranged relative to each other with some rotation about the x-axis. This relative inclination of the electrodes provides a locally limited region with extremely small electrode separation, in which the ground plasma can be generated. In accordance with another variant, it is possible to provide at least one of the electrodes 5, 6 with a locally limited coating that is conducive to the formation of a ground plasma in this region. Furthermore, it is also possible to use locally limited special surface roughness or surface structures.

It has been found to be especially advantageous to localize the ground plasma of small spatial extent and preferably low intensity in such a way that it burns in a region in which the resonator mirrors 12, 13 have areas arranged parallel to each other. With this positioning, there is a steady ground laser power in the resonator, which is not coupled out or is only slightly coupled out. In the case of confocal resonators, it is advantageous if the center axis (x-direction) of the narrow sector with the local ground plasma is perpendicular to both mirror surfaces and passes through the common focus.

Another problem associated with the operation of slab lasers is that, after the laser has been turned on, the beam paths between the resonator mirrors 12, 13 do not have the desired uniformity with respect to the spatial variation of the propagation path in the y-direction due to the present mirror geometry. This results from the fact that, with the prior-art mirrors with constant radii of curvature, starting from a mirror region in which the mirror surfaces of the two resonator mirrors 12, 13 are aligned parallel to each other, the angular position between the two resonator mirrors 12, 13 increases with increasing distance from this parallel region, thereby causing permanently increasing angles of reflection. Relatively constant angles of reflection or only slight variations of these angles would be desirable.

Independently of all of the embodiments that have already been described, the invention provides that the mirror surfaces of the resonator mirrors 12, 13 be shaped in the y-direction in a way that is conducive to evening out the radiation propagation. This is accomplished by providing at least one of the resonator mirrors 12, 13 with a changing radius of curvature. It has been found to be advantageous to use a boundary that corresponds to the peripheral segment of an ellipse instead of the usual form corresponding to a segment of a circular arc. A sequence of different radii of curvature with discontinuous curvature transitions is also possible. In particular, a course of movement is selected in such a way that constant transverse propagation of the laser radiation is achieved. These measures minimize the losses by minimizing the number of reflections.

Figure 3:
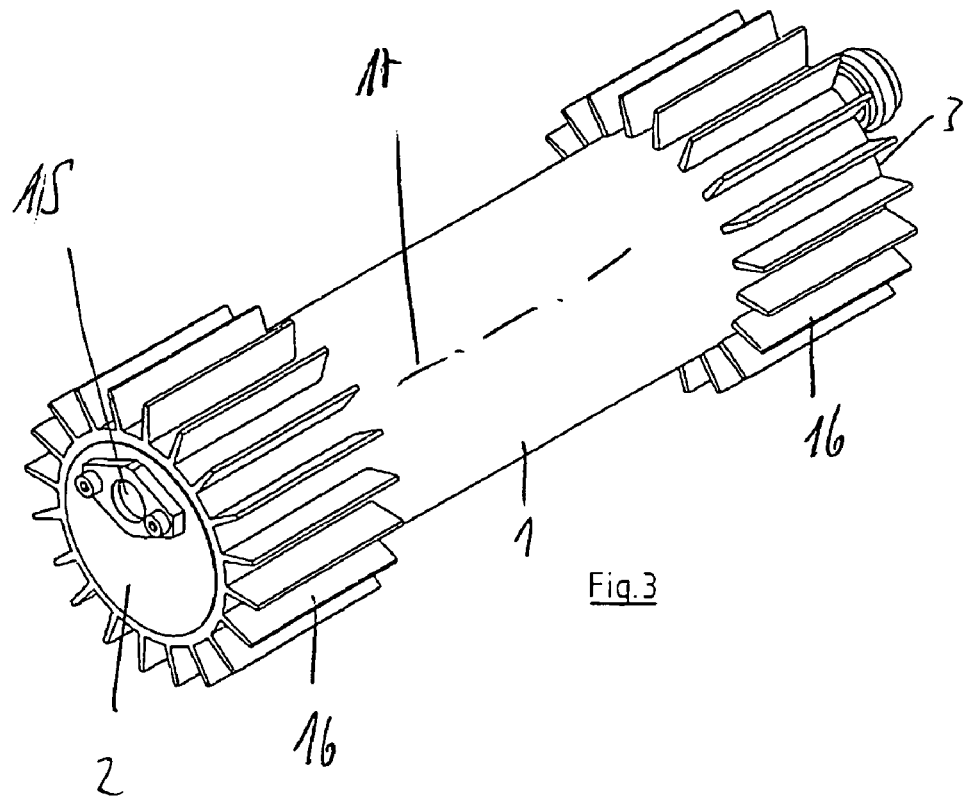
FIG. 3 shows a perspective view of a tubular housing of a laser with partial external cooling fins.

FIG. 3 shows an embodiment of the tubular housing 1 with externally arranged cooling fins 16. The cooling fins 16 extend in the longitudinal direction 17 over only a portion of the length. This has been found to be advantageous especially for low-power lasers. In the embodiment shown in FIG. 3, cooling fins 16 are arranged in the vicinity of the two ends of the tubular housing and thus facing the end pieces 2, 3, and a middle region of the outer wall of the tubular housing (1) is designed without cooling fins 16. In addition, the drawing shows an exit window 15 for the generated laser beam in the area of the end piece 2.

Figure 4:
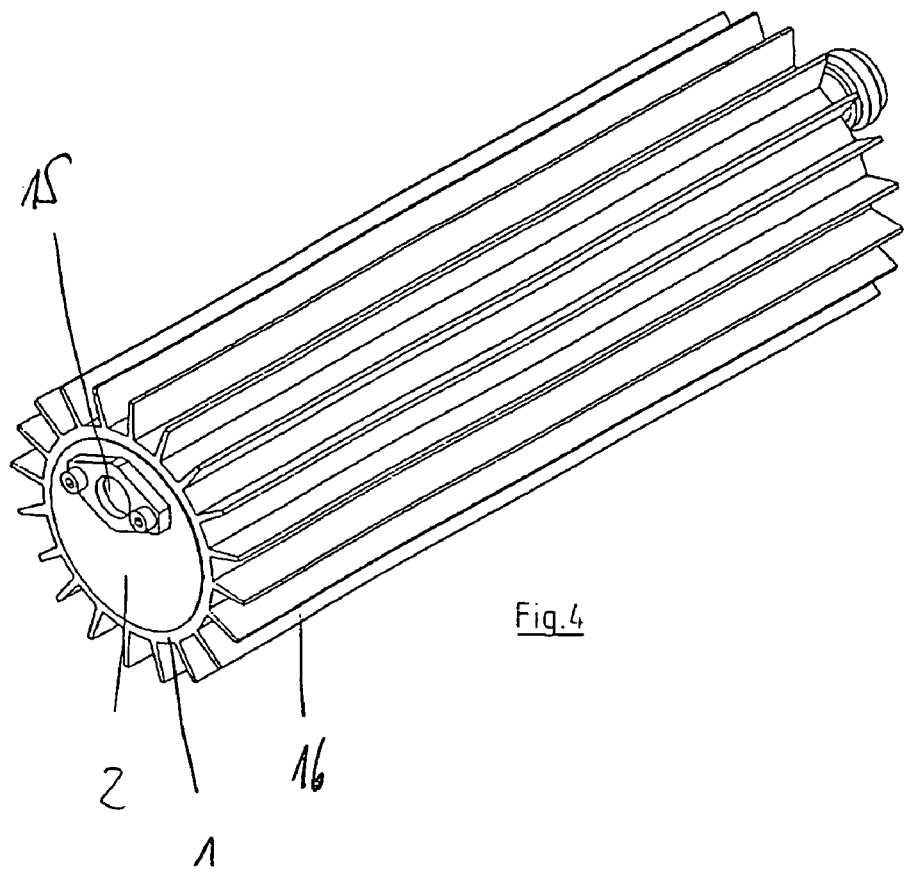
FIG. 4 shows an embodiment that is modified from FIG. 3 with external cooling fins extending over a large area of the tubular housing.

FIG. 4 shows an embodiment that is modified from FIG. 3 with the cooling fins 16 extending over the entire length of the tubular housing 1. A design of this type has been found to be advantageous for lasers of relatively high power. The cooling fins 16 help dissipate heat by radiation and also provide mechanical reinforcement of the tubular housing 1. The cooling fins can also have other spatial orientations and/or can take a curved course.

Figure 5:
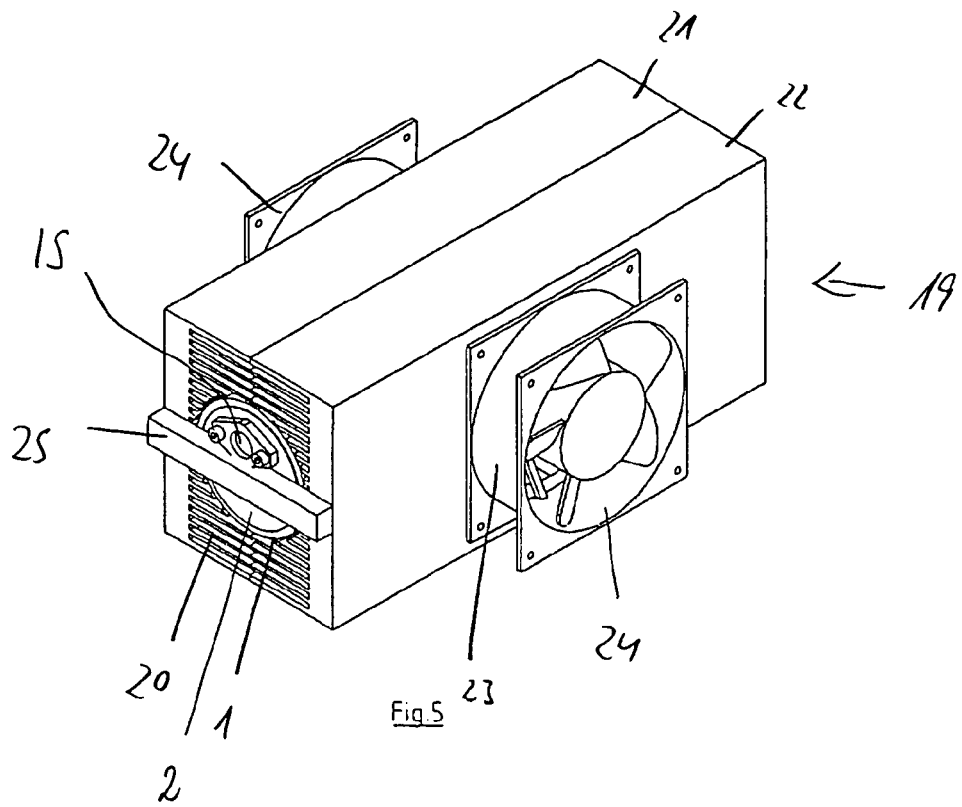
FIG. 5 shows a perspective view of a compact design for avoiding secondary introduction of heat into the tubular housing.

In the embodiment illustrated in FIG. 5, the tubular housing 1 is inserted in a carrier 19 that is provided with cooling fins 20. In this embodiment, the tubular housing 1 itself is preferably designed without cooling fins. In the embodiment according to FIG. 5, the carrier 19 consists of two heat sinks 21, 22 with their cooling fins 20 supported against one other. At least one of the heat sinks 21, 22 is provided with a ventilation recess 23 for joining with a fan 24. The fan 24 can be rigidly installed on the carrier 19, as shown in FIG. 5, but it is also possible to install the fan 24 at a distance from the carrier 19. The heat removed from the electrodes 5, 6 is introduced by a heat pipe 25 into the heat sinks 21, 22, which radiate it to the environment. It is also possible to use several fans on one or more sides.

Figure 6:
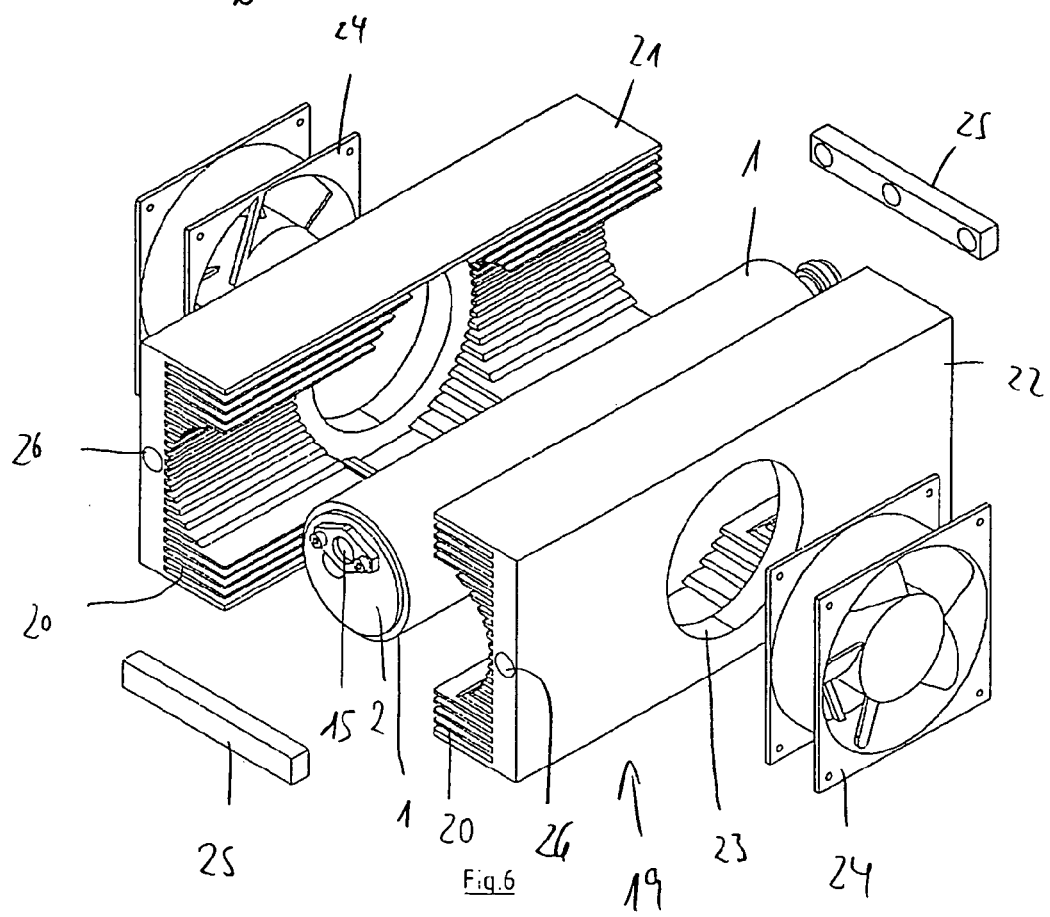
FIG. 6 shows a perspective view of the embodiment according to FIG. 5.

The structural design of the device according to FIG. 5 is made clearer by the exploded view of the device in FIG. 6. It is apparent that the heat sinks 21, 22 have an inner contour that is adapted to the outer contour of the tubular housing 1. In particular, it is proposed that the tubular housing 1 be provided with an outside diameter that is dimensioned somewhat smaller than the receiving space formed between the heat sinks 21, 22. This prevents or at least minimizes contact of the tubular housing 1 with the heat sinks 21, 22.

This design is based on the recognition that to prevent the tubular housing 1 from heating, it is necessary both to prevent heat from the inside of the tubular housing 1 from acting on the tubular housing 1 and to prevent heat transfer from the outside or heat transfer through the end pieces 2, 3. This prevents large amounts of heat from being conveyed to the outside through the tubular housing. In accordance with a variant of this embodiment, it is also proposed that the electrodes 5, 6 be mounted with thermal insulation in the area of the end pieces 2, 3 and that heat transfer from the electrodes 5, 6 to the heat sink(s) 21, 22 be realized by a fluid medium in the tubes 25. This is accomplished in an advantageous way by a heat pipe.

Alternatively, it is also conceivable to provide heat-conducting contact between the electrodes 5, 6 and the end pieces 2, 3 but to install the end pieces 2, 3 in such a way that they are thermally insulated from the tubular housing 1. When thermally insulating materials are used between the electrodes 5, 6 and the end pieces 2, 3 or between the end pieces 2, 3 and the tubular housing 1, the required electrical connection can be made by wires or other conductors, which bridge the thermal insulator to provide electric conduction but themselves result in only slight heat transfer.

FIG. 6 shows especially that cooling holes 26 are drilled to the heat sinks 21, 22 and communicate with corresponding cooling recesses of the heat pipe 25 or with the small tubes 7, shown in FIG. 2. This allows circulation of the cooling fluid through the tubes 7, 8, the heat pipe 25 and the heat sinks 21, 22 to promote optimum heat dissipation and cooling.

The arrangement of the tubular housing 1 with the most extensive thermal insulation possible, as explained above, is effective not only in slab lasers but also in lasers in general, in which deformation of the tubular housing is to be largely avoided to avoid misalignment.

The invention claimed is:

1. Gas slab laser with a gas-filled chamber bounded by a tubular housing and sealing end pieces, with at least two electrodes excited by high frequency, which extend into the tubular housing, overlap each other and form a discharge chamber, and with resonator mirrors, wherein the resonator is adjusted by plastic deformation of the tubular housing and the sealing end pieces to produce the required spatial alignment of the resonator mirrors as well as the electrodes relative to each other, wherein the electrodes and the mirrors are connected to each other, so that adjustment thereof is at the same time.

2. Gas slab laser with a gas-filled chamber bounded by a tubular housing and sealing end pieces, with at least two electrodes excited by high frequency, which extend into the tubular housing, overlap each and form a discharge chamber, and with resonator mirrors, wherein the resonator is adjusted by elastic deformation of the tubular housing and the sealing end pieces by application of a force to produce the required spatial alignment of the resonator mirrors as well as the electrodes relative to each other, wherein the electrodes and the mirrors are connected to each other, so that adjustment thereof is at the same time.

3. Gas slab laser according to claim 1, wherein the plastic deformation is carried out by shot peen forming.

4. Gas slab laser according to claim 2, wherein the application of a force is by a constant elastic force with a force F and opposing supports A and B.

5. Gas slab laser according to claim 2, wherein the application of a force is by electrical elements.

6. Gas slab laser according to claim 5, wherein the electrical elements are piezoelectric devices or electromagnets.

7. Gas slab laser according to claim 2, wherein the application of a force is by a medium.

8. Gas slab laser according to claim 7, wherein the medium is compressed air or hydraulic fluid.

9. Gas slab laser according to claim 2, wherein the application of a force is by heating elements which heat the laser housing on one side and thus introduce forces.

10. Gas slab laser according to claim 2, wherein the application of a force is by permanent magnets.

11. Gas slab laser according to claim 2, wherein the force is applied mechanically.

12. Gas slab laser according to claim 11, wherein the force is applied by a clamping screw.

13. Gas slab laser according to claim 2, wherein the force is variable and applied from a controller.

* * * * *